Figure 1:
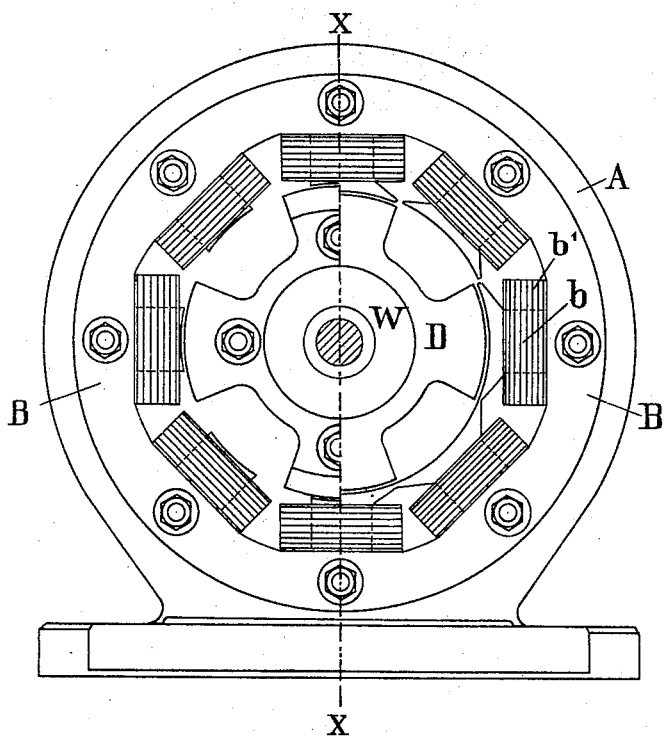

(No Model.) 2 Sheets—Sheet 1.
J. SOHLMAN.
DYNAMO ELECTRIC MACHINE.

No. 469,281. Patented Feb. 23, 1892.

Witnesses:
Walter Allen

Inventor.
Johannes Sohlman
by Herbert W. T. Jenner.
Atty.

(No Model.) 2 Sheets—Sheet 2.

J. SOHLMAN.
DYNAMO ELECTRIC MACHINE.

No. 469,281. Patented Feb. 23, 1892.

Witnesses:
Walter Allen

Inventor.
Johannes Sohlman
by Herbert W. Jenner
Atty.

UNITED STATES PATENT OFFICE.

JOHANNES SOHLMAN, OF FREDERIKSHAMN, FINLAND, RUSSIA.

DYNAMO-ELECTRIC MACHINE.

SPECIFICATION forming part of Letters Patent No. 469,281, dated February 23, 1892.

Application filed September 18, 1891. Serial No. 406,063. (No model.)

*To all whom it may concern:*

Be it known that I, JOHANNES SOHLMAN, engineer, a subject of the Emperor of Russia, residing at Frederikshamn, Finland, Russia, have invented certain new and useful Improvements in Improved Electric-Current Generators for Ordinary and Multiple Phase Alternating Currents; and I do hereby declare the following to be a full, clear, and exact description of the invention, such as will enable others skilled in the art to which it appertains to make and use the same.

The alternating-current generators heretofore employed having polar armatures have the disadvantage that in consequence of the great speed at which the reversion of the magnetism of the iron cores takes place on the one hand a great portion of the mechanical energy required for generating the electric current is lost, being converted into heat, while on the other hand other disadvantages, such as vortex currents, are produced by the varying magnetic resistance. Furthermore, it has not yet been possible to produce at will in one and the same machine either ordinary or multiple phase alternating currents, as also to feed with one and the same machine rotary-phase multiple-conductor systems having a varying number of conductors. It was consequently also heretofore necessary in transmitting electro-motive force by the means available through a rotary-phase alternating-current system with several conductors to make the windings of the current-generator to correspond with those of the electro-motor, and in consequence thereof it was always necessary to employ with a certain system of electric motors a certain construction of current-generators, any change in former necessitating a corresponding change in the latter.

The present invention relates to an alternate-current machine in which the reversal of the magnetism of the iron cores and the resulting heating thereof is obviated and in which the advantages of the machines with polar armatures (low magnetic resistance and avoidance of vortex currents in the windings, even when these are thick) are combined with those of machines with armatures without cores, (constant magnetic resistance.)

The arrangement furthermore has the advantage that with one and the same alternate-current machine, according to requirements, either two conductor systems for ordinary alternating currents or multiple-conductor systems for rotary-phase currents with varying number of phases can be worked.

Figure 2:
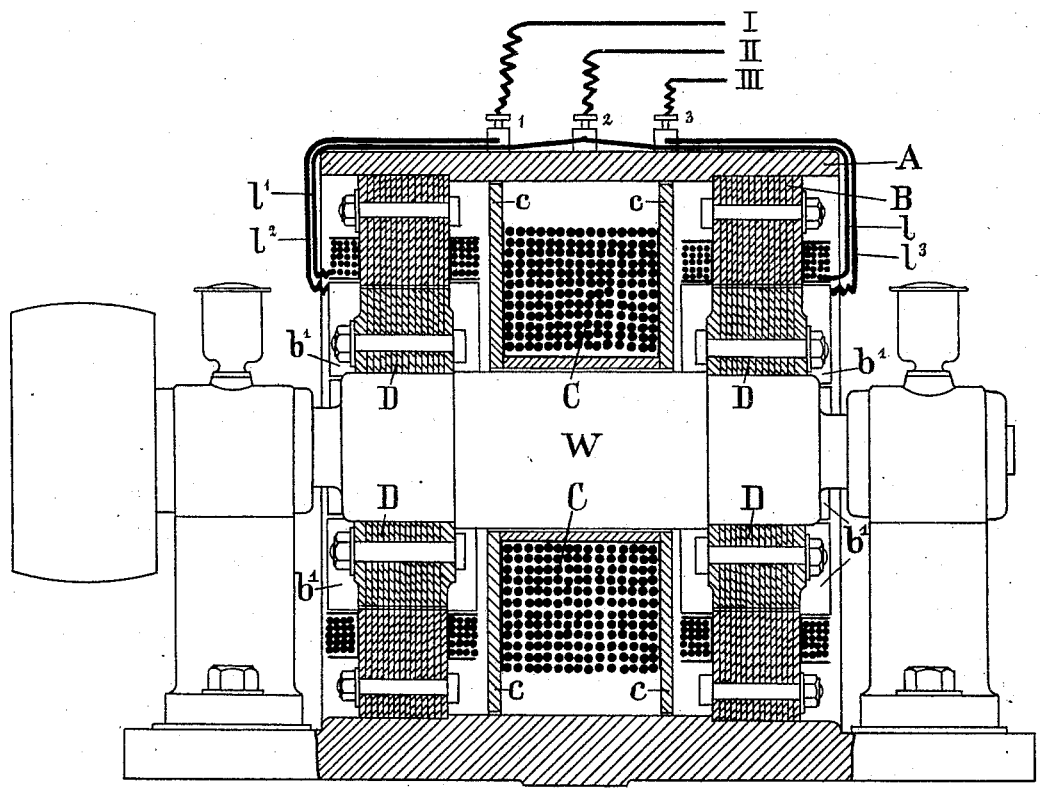

Figure 1 of the accompanying drawings shows a front view of an electric-current generator constructed according to this invention, showing on each side of the vertical center line a different form of armature-poles and field-magnets. Fig. 2 shows a section on line $x$ $x$, Fig. 1, the poles being formed according to one or other of the two arrangements.

A is the outer cast-iron casing of the machine, within each end of which is adjustably fixed by screws a ring-shaped armature B, formed of sheet-iron. On the several poles $b$ of these armature-rings are placed the induction-coils $b'$, the free ends of which are led to the screw-terminals 1 2 3 on the outside of the casing A, (assuming that two or three phase rotary current is to be produced to be distributed through three conductors I II III.)

The shaft W carries within the casing A two systems D of pole-pieces, formed either of layers of sheet-iron or solid, which are advantageously made of such a width that they can simultaneously cover one-half of two adjacent armature-poles. The middle part of the shaft W is increased in size in order to reduce the magnetic resistance to a minimum, and carries an exciting-coil C, which is stationary if the machine is independently excited, but which revolves with the shaft if the machine is self-excited, (with commutator for the exciting-coils.)

As the two armature-rings B and the two groups of field-magnet poles D have an equal number of poles it will be seen that by shifting either the armature-poles or the field-magnet poles relatively to each other, either an ordinary or a two phase alternating current can be produced. If, for example, the two armature-rings B are so adjusted that their poles accurately cover each other when looking in the axial direction, and if the groups of field-magnet poles D are so placed that their poles are also in line with each other, then both rings will act as a single armature-ring, and ordinary alternating currents will be produced. In this case both armaturecircuits can be either connected in parallel or in series. If, on the other hand, either the armature-rings B are somewhat shifted relatively to each other, while the groups of field-magnet poles D remain in their original position, or if the armature-rings be left in their original position and the groups of field-magnet poles D be shifted relatively to each other, then, if the free ends $l\ l'$ be connected to the terminal 2, and the conductors $l^2\ l^3$ to the terminals 1 and 3, a two-phase alternating current will be produced. If the conductors I and II, II and III are connected by branch conductors there will be produced in these branches alternating currents of different phases; but if in the distributing-network I be combined with II, II with III, and, in addition, I with III, the two-phase current is divided into three currents of different phases. If the phase difference of the two-phase current is equal to 120°, the phase difference of the three currents in the branch conductors is equal to 60°, and all three currents are of equal intensity. With transmission of power with three-phase rotary-phase currents the rings are therefore so placed that the phase difference of the electro-motive force in the two rings is equal to 120°.

The number of armature-rings B and also the number of groups of field-magnet poles can be increased at will if alternating currents with more than three phases are to be produced.

The magnetic resistance is rendered constant by making the magnet-poles of such a width that the surface of the air-space passed over is rendered constant. The constancy of the magnetic resistance can, however, be advantageously further increased by connecting the pole-pieces of the armature-rings with each other in the manner indicated at the lower right-hand part of Fig. 1.

What I claim is—

1. The combination, with the two stationary annular armatures provided with induction-coils, of a central shaft and the two groups of field-magnet poles carried by the said shaft and adapted to be revolved within the two said armatures, the said pairs of armatures and groups having an equal number of poles and the position of the corresponding elements of the pairs being adjustable relative to each other, substantially as and for the purpose set forth.

2. The combination, with the two stationary annular armatures provided with induction-coils, of a central shaft and the two groups of field-magnet poles carried by the said shaft and adapted to be revolved within the two said armatures, the said pairs of armatures and groups having an equal number of poles proportioned so that each pole of one element can cover simultaneously the halves of the two adjacent poles of the other element, and the position of the corresponding elements of the pairs being adjustable relative to each other, substantially as and for the purpose set forth.

In testimony whereof I affix my signature in presence of two witnesses.

JOHANNES SOHLMAN.

Witnesses:
ALBIN WINTER,
ELIS J. HUSTIN.